(12) United States Patent
Jung et al.

(10) Patent No.: US 8,557,432 B2
(45) Date of Patent: *Oct. 15, 2013

(54) SECONDARY BATTERY PACK EXHIBITING ENHANCED COUPLING STRENGTH BETWEEN A BATTERY CELL AND MOUNTING MEMBERS

(75) Inventors: Soonkwang Jung, Seoul (KR); Sukjin Song, Yongin-si (KR)

(73) Assignee: LG Chem, Ltd., Seoul (KR)

( * ) Notice: Subject to any disclaimer, the term of this patent is extended or adjusted under 35 U.S.C. 154(b) by 678 days.

This patent is subject to a terminal disclaimer.

(21) Appl. No.: 12/445,339

(22) PCT Filed: Oct. 4, 2007

(86) PCT No.: PCT/KR2007/004838
§ 371 (c)(1),
(2), (4) Date: Dec. 9, 2009

(87) PCT Pub. No.: WO2008/050956
PCT Pub. Date: May 2, 2008

(65) Prior Publication Data
US 2010/0086845 A1   Apr. 8, 2010

(30) Foreign Application Priority Data

Oct. 23, 2006 (KR) ........................ 10-2006-0102634

(51) Int. Cl.
*H01M 2/02* (2006.01)
*H01M 2/04* (2006.01)
*H01M 2/08* (2006.01)

(52) U.S. Cl.
USPC ........... 429/163; 429/178; 429/182; 429/185; 429/164; 429/175

(58) Field of Classification Search
USPC ............... 429/65, 164, 178, 7, 185, 163, 182; 29/623.5
See application file for complete search history.

(56) References Cited

U.S. PATENT DOCUMENTS 3,320,096 A * 5/1967 Jammet ........................ 429/185
5,976,729 A * 11/1999 Morishita et al. ............... 429/65

(Continued)

FOREIGN PATENT DOCUMENTS

| JP | 64-086444 A | 3/1989 |
|---|---|---|
| JP | 2000-260419 A | 9/2000 |
| JP | 2006-4882 A | 1/2006 |
| JP | 2006-140149 A | 6/2006 |
| KR | 10-2002-0077175 A | 10/2002 |
| KR | 10-2005-0074197 A | 7/2005 |
| KR | 10-2006-0032591 A | 4/2006 |

*Primary Examiner* — Kenneth Douyette
(74) *Attorney, Agent, or Firm* — Birch, Stewart, Kolasch & Birch, LLP

(57) ABSTRACT

Disclosed herein is a secondary battery pack including a battery cell having an electrode assembly of a cathode/separator/anode structure mounted in a battery case together with an electrolyte in a sealed state, an insulative mounting member having openings, through which electrode terminals of the battery cell are exposed to the outside, the insulative mounting member being constructed in a structure in which a safety element is mounted to the top of the insulative mounting member, the insulative mounting member being in direct contact with the top of the battery cell, and an insulative cap coupled to the top of the battery cell such that the insulative cap surrounds the insulative mounting member while the safety element is mounted to the insulative mounting member, wherein the battery case is provided at the top thereof with at least one coupling groove, and the insulative mounting member is provided at the bottom thereof with at least one coupling protrusion corresponding to the at least one coupling groove, whereby the coupling of the insulative mounting member to the battery cell is accomplished by the insertion of the at least one coupling protrusion into the at least one coupling groove. The assembly process of the secondary battery pack according to the present invention is greatly simplified. Also, the volume of the member mounted to the top of the battery cell is minimized, and, at the same time, the coupling strength between the battery cell and the mounting member is stably maintained.

18 Claims, 8 Drawing Sheets

(56) References Cited

U.S. PATENT DOCUMENTS

| | | | |
|---|---|---|---|
| 6,620,544 B1 * | 9/2003 | Shin et al. | 429/56 |
| 2002/0142195 A1 | 10/2002 | Ehara | |
| 2004/0137322 A1 | 7/2004 | Hong et al. | |
| 2004/0251872 A1 | 12/2004 | Wang et al. | |
| 2005/0175889 A1 | 8/2005 | Han | |
| 2005/0208346 A1 | 9/2005 | Moon et al. | |
| 2005/0221175 A1 * | 10/2005 | Yoon | 429/164 |
| 2005/0266279 A1 | 12/2005 | Kim | |
| 2006/0057459 A1 | 3/2006 | Kwon et al. | |
| 2006/0099492 A1 | 5/2006 | Jeon | |

* cited by examiner

SECONDARY BATTERY PACK EXHIBITING ENHANCED COUPLING STRENGTH BETWEEN A BATTERY CELL AND MOUNTING MEMBERS

FIELD OF THE INVENTION

The present invention relates to a secondary battery pack constructed such that an insulative mounting member is coupled to the top of a battery cell through a specific coupling structure, and, more particularly, to a secondary battery pack including a battery cell having an electrode assembly of a cathode/separator/anode structure mounted in a battery case together with an electrolyte in a sealed state, an insulative mounting member having openings, through which electrode terminals of the battery cell are exposed to the outside, the insulative mounting member being constructed in a structure in which a safety element is mounted to the top of the insulative mounting member, the insulative mounting member being in direct contact with the top of the battery cell, and an insulative cap coupled to the top of the battery cell such that the insulative cap surrounds the insulative mounting member while the safety element is mounted to the insulative mounting member, wherein the battery case is provided at the top thereof with at least one coupling groove, and the insulative mounting member is provided at the bottom thereof with at least one coupling protrusion corresponding to the at least one coupling groove, whereby the coupling of the insulative mounting member to the battery cell is accomplished by the insertion of the at least one coupling protrusion into the at least one coupling groove.

BACKGROUND OF THE INVENTION

As mobile devices have been increasingly developed, and the demand of such mobile devices has increased, the demand of secondary batteries has also sharply increased. Among them is a lithium secondary battery having high energy density and voltage and excellent preservation and service-life characteristics, which has been widely used as an energy source for various electronic products as well as the mobile devices.

On the other hand, various kinds of combustible materials are contained in the lithium secondary battery. As a result, the lithium secondary battery may be heated or explode due to the overcharge of the battery, the overcurrent in the battery, or other physical external impacts. That is, the safety of the lithium secondary battery is very low. Consequently, the lithium secondary battery includes a protection circuit module (PCM), which is connected to the battery cell for effectively controlling an abnormal state of the battery, such as the overcharge of the battery.

Generally, it is required for safety elements, including the PCM, to be maintained in electrical connection with electrode terminals of the battery cell and, at the same time, to be electrically isolated from other parts of the battery cell. Consequently, a plurality of insulative mounting members are required to construct such connection, which complicates the battery assembly process. Also, an adhesive is applied between the battery cell and the insulative mounting members such that the insulative mounting members are fixed to the battery cell by the adhesive. However, this coupling method reduces the strength of the battery. When physical impacts are applied to the battery cell, the reduction of the coupling strength induces the occurrence of a short circuit in the battery cell, with the result that the battery may catch fire and explode, and therefore, the safety of the battery is lowered.

For this reason, much research has been carried out to reduce the number of the insulative mounting members, which are coupled to the battery cell, and, at the same time, to improve the mechanical strength of the battery cell. For example, Korean Patent Application Publication No. 2002-077175 discloses a structure in which lock protrusions are formed at a battery case or a cover, which is mounted to the top of the battery case, and lock receiving parts are formed at the cover or the battery case, such that the cover is coupled to the battery case by the engagement between the lock protrusions and the corresponding lock receiving parts. Korean Patent Registration No. 0561298 discloses a structure in which concavo-convex parts are formed at the coupling interfaces between a bare cell and a battery component section located at the top of the bare cell such that the battery component section is coupled to the bare cell by the engagement between the concavo-convex parts of the bare cell and the corresponding concavo-convex parts of the battery component section. Also, Japanese Patent Application Publication No. 2006-140149 discloses a structure in which a protecting cover is coupled to a cell by the engagement between a conductive press member, mounted to the terminal part of the cell and a conductive insertion member, which is inserted into the conductive press member.

However, the above-described technologies have problems in that male and female type coupling members are additionally formed at the top of the bare cell and the bottom of the cell cover, and an additional insulation member is mounted between a protection circuit board, which is disposed between the bare cell and the cell cover, and the bare cell for accomplishing the electrical insulation between the protection circuit board and the bare cell.

In addition, Japanese Patent Application Publication No. 2006-04882 discloses a structure in which the bare cell is provided at opposite sides of the top thereof with coupling grooves, and the top cap is provided at the bottom thereof with coupling protrusions corresponding to the coupling grooves, such that the top cap is coupled to the bare cell by the forcible insertion of the coupling protrusion into the corresponding coupling grooves. Also, Korean Patent Application Publication No. 2006-32591 discloses a secondary battery constructed in a structure in which a top cover is mounted to a battery core, while a "structure supporting member" for supporting a protection circuit board is inserted into the top of the battery core, the battery core is provided at the top thereof with position holes, and the top cover is provided at the bottom thereof with position notches.

However, the above-described technologies have problems in that an additional member is inserted between the terminals of the battery cell and the protection circuit board for accomplishing the electrical insulation between the terminals of the battery cell and the protection circuit board, which complicates the assembly process. The problems will be described below in more detail.

Generally, a protection circuit module (PCM), including a protection circuit for controlling the overcharge, the overdischarge, and the overcurrent of the battery, is mounted to one side of a secondary battery where electrode terminals of the secondary battery are exposed to the outside. It is required for the PCM to be electrically connected to the both electrode terminals of the battery cell, and, at the same time, to be electrically insulated from the remaining parts of the battery cell such that the occurrence of a short circuit in the battery cell is prevented. Consequently, it is required for an insulative member to be inserted between the PCM board and the battery cell. In addition, it is required to provide an additional conductive member, such as a connection pin, for the electrical connection with the electrode terminals.

Also, in the technology for mounting the structure supporting member, for supporting the protection circuit board to the top of the battery core, the structure supporting member merely serves to guide the protection circuit board, such that the protection circuit board is mounted in position, and to support the protection circuit board. Furthermore, the protection circuit board is mounted to the bottom of the structure supporting member, with the result that the provision of an additional insulative member is still required.

The additional provision of the insulative/conductive members complicates the assembly process. Also, the additional disposition of a plurality of members between the battery cell and the top cap reduces the mechanical coupling strength.

Consequently, there is a high necessity for a technology that is capable of reducing the number of members mounted to the top of the battery cell to simplify the assembly process and securing stable coupling strength between the battery cell and the mounting members.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present invention have found that, when an insulative mounting member is placed at the top of a battery cell, through a specific coupling structure, to construct a secondary battery pack, the assembly process of the secondary battery pack is greatly simplified, the volume of the insulative mounting member coupled to the top of a battery cell is minimized, and it is possible to maintain a stable coupling strength.

Therefore, it is an object of the present invention to provide a secondary battery pack constructed such that an insulative mounting member is coupled to the top of a battery cell through a specific coupling structure.

In accordance with the present invention, the above and other objects can be accomplished by the provision of a secondary battery pack including a battery cell having an electrode assembly of a cathode/separator/anode structure mounted in a battery case together with an electrolyte in a sealed state, an insulative mounting member having openings, through which electrode terminals of the battery cell are exposed to the outside, the insulative mounting member being constructed in a structure in which a safety element is mounted to the top of the insulative mounting member, the insulative mounting member being in direct contact with the top of the battery cell, and an insulative cap coupled to the top of the battery cell such that the insulative cap surrounds the insulative mounting member while the safety element is mounted to the insulative mounting member, wherein the battery case is provided at the top thereof with at least one coupling groove, and the insulative mounting member is provided at the bottom thereof with at least one coupling protrusion corresponding to the at least one coupling groove, whereby the coupling of the insulative mounting member to the battery cell is accomplished by the insertion of the at least one coupling protrusion into the at least one coupling groove.

The secondary battery pack according to the present invention includes the battery cell, in which the electrode assembly is received, the insulative mounting member, on the top of which the safety element is mounted such that the insulative mounting member is in tight contact with the top of the battery cell, and the insulative cap, which is coupled to the top of the battery cell. The coupling between the insulative mounting member and the top of the battery cell is accomplished by the engagement between the coupling grooves and the coupling protrusions corresponding to the coupling grooves.

It is required for the battery case to be easily manufactured and to exhibit a mechanical strength greater than a predetermined level. For this reason, the battery case is a metal container, preferably an aluminum container.

The insulative mounting member is constructed in a structure in which the safety member is mounted on the top of the insulative mounting member. The insulative mounting member is an insulative member that is in direct contact with the top of the battery cell. In a preferred embodiment, the insulative mounting member has a size approximately corresponding to that of the top of the battery cell, the insulative mounting member is provided at the middle thereof with a first opening, through which the first electrode terminal of the battery cell is exposed to the outside, and the insulative mounting member is provided at a position spaced a predetermined distance from the first opening with a second opening, through which a portion of the top of the battery case of the battery cell (the second electrode terminal) is exposed to the outside. Also, the insulative mounting member may be constructed in a structure in which opposite-side ends of the insulative mounting member protrude upward by a predetermined height to secure a space necessary for mounting the safety element.

The safety element may include a protection circuit module having a protection circuit for controlling the overcharge, the overdischarge, and the overcurrent of the battery and a pair of connecting members electrically connected to the protection circuit, which is mounted to the bottom of the rectangular protection circuit module. Preferably, the safety element is one or more selected from a group consisting of a positive temperature coefficient (PTC) element, a fuse, and a protection circuit board.

According to circumstances, the safety element may include a PTC element and a protection circuit board, one end of the PTC element may be connected to the first electrode terminal of the battery cell, the other end of the PTC element may be connected to the protection circuit board, and the second electrode terminal of the battery cell may be connected to the protection circuit board.

Preferably, the electrical connection (a) between the PTC element and the protection circuit board and the electrical connection (b) between the second electrode terminal and the protection circuit board are carried out by variable connecting members. More preferably, the connecting member for the electrical connection (a) and the member for the electrical connection (b) are coupled to the protection circuit board, and the connecting members are coupled to the respective electrode terminals of the battery cell.

The connecting members are not particularly restricted so long as the connecting members are made of a variable conductive material. Preferably, the connecting members are nickel plates.

The connecting members are coupled to the electrode terminals of the battery cell, while the protection circuit board is placed on the top of the battery cell such that the angle between the protection circuit board and the top of the battery cell exceeds approximately 90 degrees, the variable connecting members are bent such that the protection circuit board is placed on the insulative mounting member while the protection circuit board is parallel with the top of the battery cell, and the connecting members are coupled to the protection circuit board such that the bent portions of the connecting members are directed to the same side.

For example, the nickel plates may be coupled to the electrode terminals by spot welding, while the plate-shaped PCM is located such that the PCM is perpendicular to the top of the battery cell, and the nickel plates may be bent such that the PCM is placed on the insulative mounting member while the PCM is in parallel with the top of the battery cell.

The coupling between the coupling grooves and the coupling protrusions is accomplished in the longitudinal direction of the battery cell, with the result that the coupling between the coupling grooves and the coupling protrusions may be weaker due to the longitudinal tensile force than due to vertical impacts applied to the battery cell. Consequently, the coupling protrusions may be inserted into the corresponding coupling grooves, after an adhesive is injected into the coupling grooves, to solve the above-mentioned problem.

The insulative cap serves to protect the battery cell against external impacts, to complement the mechanical strength of the members mounted to the top of the battery cell, and to maintain the electrical insulation. To this end, the insulative cap may extend downward by a predetermined length sufficient for at least some of the insulative cap to surround the outside of the top of the battery cell while the insulative cap is mounted on the battery cell. In order to maximize this effect, the downward extending portion of the insulative cap is preferably fixed to the outside of the top of the battery cell by a bonding fashion or a mechanical coupling fashion.

The secondary battery pack may further include another insulative cap (bottom cap) coupled to the bottom of the battery cell in addition to the insulative cap coupled to the top of the battery cell. Furthermore, the secondary battery pack may further include a sheathing film attached to the outer surface of the battery case of the battery cell. Consequently, it is possible to protect the battery cell against external impacts and to maintain the electrical insulation. Preferably, the sheathing film is attached to the outer surface of the battery case of the battery cell such that the sheathing film surrounds the downward extending portion of the insulative cap.

The secondary battery pack according to the present invention is applicable to any battery cells in various manners, irrespective of the kind and shape of the battery cells. Preferably, the battery cell is a prismatic lithium secondary battery cell.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF MAIN REFERENCE NUMERALS OF THE DRAWINGS

| 100 | battery cell | 110 | coupling grooves |
| 200 | insulative mounting member | 210 | coupling protrusions |
| 300 | safety element | 400 | insulative cap |

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
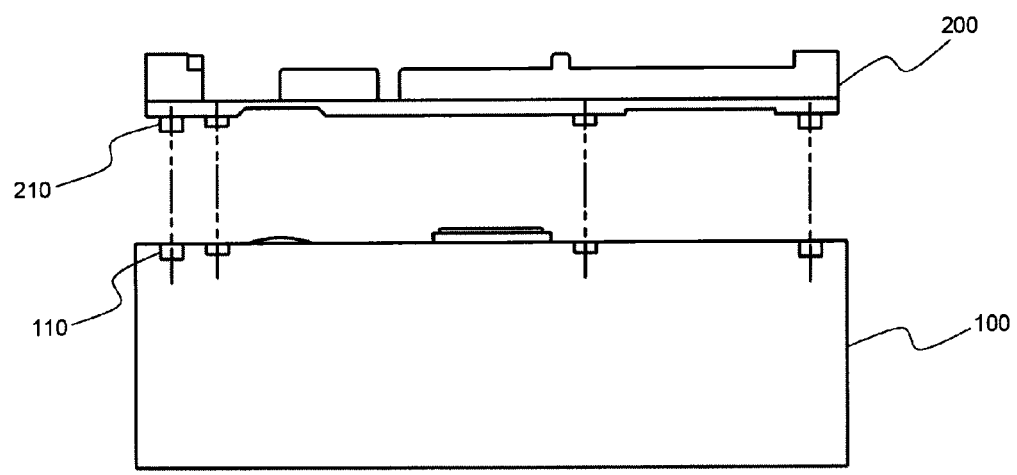
FIGS. 1 and 2 are front views illustrating the structure of a secondary battery pack according to a preferred embodiment of the present invention, before and after an insulative mounting member is coupled to a battery cell of the secondary battery pack, respectively.
Figure 2:
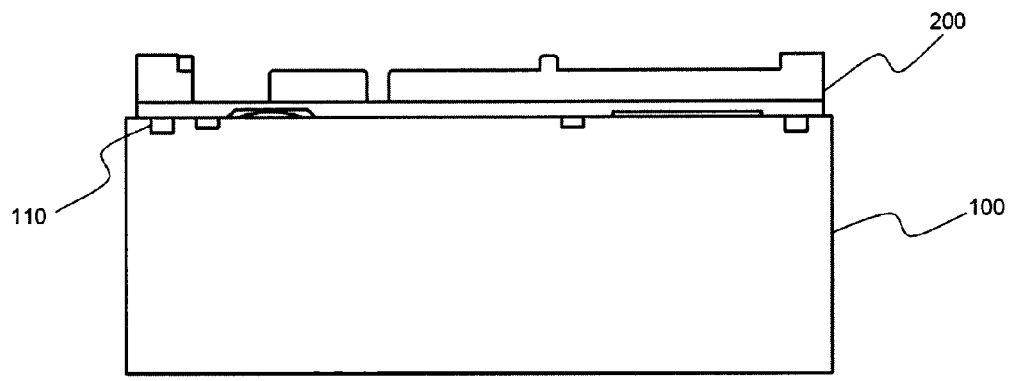

FIGS. 1 and 2 are front views illustrating the structure of a secondary battery pack according to a preferred embodiment of the present invention, before and after an insulative mounting member is coupled to a battery cell of the secondary battery pack, respectively.

Referring to these drawings, a plurality of coupling grooves 110 are formed at the top of the battery cell 100, and coupling protrusions 210, corresponding to the coupling grooves 110, are formed at the bottom of the insulative mounting member 200. The battery cell 100 is constructed in a structure in which an electrode assembly (not shown) of a cathode/separator/anode structure is mounted in a battery case (metal container) together with an electrolyte in a sealed state. Electrode terminals are formed at the top of the battery cell 100.

The insulative mounting member 200 is an insulating member having openings (not shown), through which the electrode terminals are exposed to the outside, while maintaining the electrical insulation between the battery cell 100 and the openings. The insulative mounting member 200 is mounted to the top of the battery cell 100 such that the insulative mounting member 200 is brought into tight contact with the battery cell 100. The coupling between the battery cell 100 and the insulative mounting member 200 is accomplished by the insertion of the coupling protrusions 210 into the corresponding coupling grooves 110.

Figure 3:
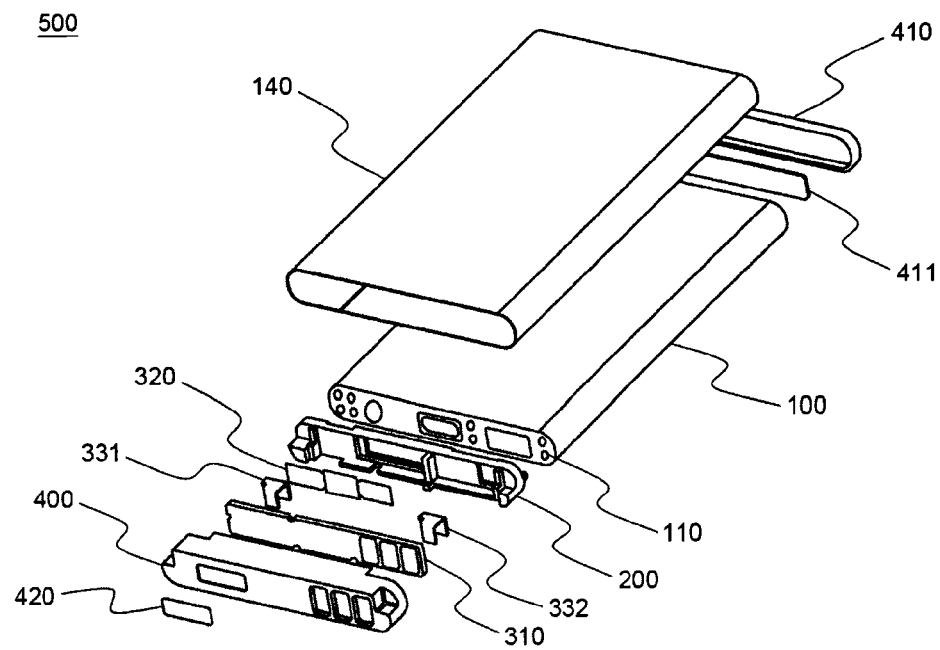
FIG. 3 is an exploded perspective view illustrating a secondary battery pack according to a preferred embodiment of the present invention.

FIG. 3 is an exploded perspective view illustrating a secondary battery pack according to a preferred embodiment of the present invention.

Referring to FIG. 3, the secondary battery pack 500 according to the present invention includes a battery cell 100, an insulative mounting member 200, a safety element including a protection circuit board 310 and a positive temperature coefficient (PTC) element 320, insulative top and bottom caps 400 and 410, and a sheathing film 140.

The battery cell 100 is constructed in a structure in which an electrode assembly of a cathode/separator/anode structure is mounted in a prismatic metal container together with an electrolyte in a sealed state. At the top of the battery cell 100 are formed a plurality of coupling grooves 110, which are concave such that the insulative mounting member 200 is coupled to the top of the battery cell 100.

The insulative mounting member 200 has openings, through which electrode terminals 120 and 130 of the battery cell 100 are exposed to the outside. The opposite-side ends of the insulative mounting member 200 protrude upward by a predetermined height such that the protection circuit board 310 and the PTC element 320, as the safety element, can be stably coupled to the top of the insulative mounting member 200. The insulative mounting member 200 is coupled to the top of the battery cell 100 such that the insulative mounting member 200 is brought into direct contact with the top of the battery cell 100. Also, the insulative mounting member 200 is provided at the bottom thereof with a plurality of coupling protrusions, corresponding to the coupling grooves 110 formed at the top of the battery cell 100.

The insulative top cap 400 is coupled to the top of the battery cell 100, such that the insulative top cap 400 surrounds the insulative mounting member 200, while the safety element is coupled to the top of the insulative mounting member 200. The insulative top cap 400 extends downward by a predetermined length sufficient to surround the outside of the top of the battery cell 100. To one side of the top of the insulative top cap 400 is attached a warranty label 420.

The bottom cap 410 is fixed to the bottom of the battery cell 100 by a bottom cap tape 411. The outer circumference of the battery cell 100 is surrounded by the insulative sheathing film 140. The structure of the safety element 300 will be described below in detail with reference to FIG. 6.

Hereinafter, the top of the battery cell and the insulative mounting member, which will be coupled to the top of the battery cell, will be described in more detail with reference to FIGS. 4 and 5.

Figure 4:
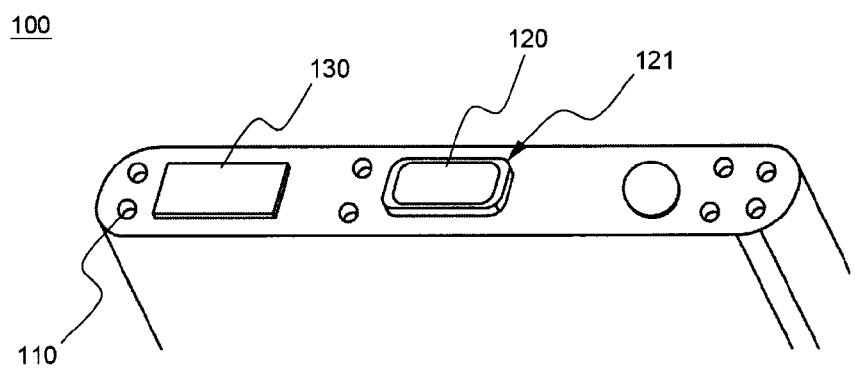
FIG. 4 is a partial perspective view illustrating the top of a battery cell according to a preferred embodiment of the present invention.

Referring to FIG. 4, the anode terminal 120 protrudes from the middle of the top of the battery cell 100. The battery case itself constitutes the cathode, and the anode terminal 120 is electrically insulated from the battery case by an insulative member 121. Consequently, the cathode terminal 130 is formed by attaching a nickel clad member to a predetermined region of the top of the battery cell 100. A pair of coupling grooves 110 are formed at each side of the top of the battery cell such that the coupling protrusions of the insulative mounting member 200 (see FIG. 3) are inserted into the coupling grooves 110.

Figure 5:
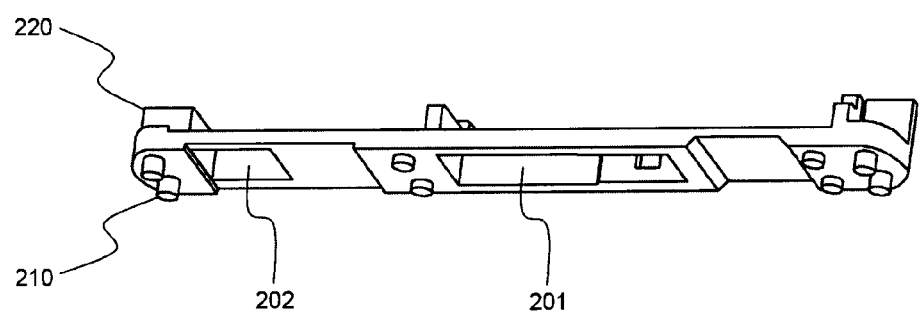
FIG. 5 is a perspective view illustrating an insulative mounting member, which will be coupled to the top of the battery cell according to the present invention.

FIG. 5 is a perspective view illustrating an insulative mounting member, which will be coupled to the top of the battery cell. The insulative mounting member 200 has a size approximately corresponding to that of the top of the battery cell 100. The insulative mounting member 200 is provided at the middle thereof with a first opening 201, through which the anode terminal 120 (see FIG. 4) of the battery cell is exposed to the outside. Also, a second opening 202, through which a portion of the top of the battery cell 100 (the cathode terminal 130 of FIG. 4) is exposed to the outside, is formed at the insulative mounting member 200 such that the second opening 202 is spaced a predetermined distance from the first opening 201. Opposite-side ends 220 of the insulative mounting member 200 protrude upward by a predetermined height to provide a space sufficient to couple the safety element 300 (see FIG. 6).

Also, the insulative mounting member 200 is provided at the bottom thereof with a plurality of coupling protrusions 210, corresponding to the coupling grooves 110 (see FIG. 4) formed at the top of the battery cell 100. The coupling protrusions 210 is engaged into the coupling grooves 110 formed at the top of the battery cell 100, whereby the mechanical coupling between the battery cell 100 and the insulative mounting member 200 is accomplished.

Figure 6:
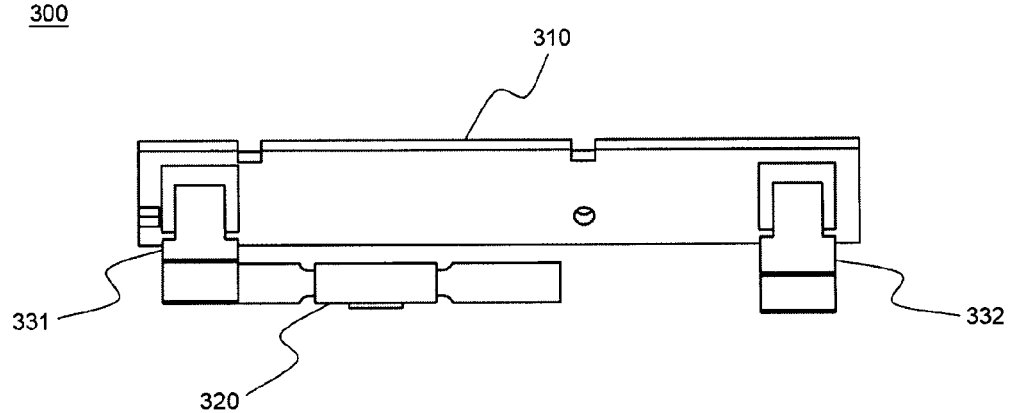
FIG. 6 is a perspective view illustrating a safety element, which will be coupled to the insulative mounting member according to the present invention.

FIG. 6 is a perspective view illustrating a safety element, which will be coupled to the insulative mounting member according to the present invention.

Referring to FIG. 6, the safety element 300 includes the protection circuit board 310 and the PTC element 320. The protection circuit board 310 is constructed in a printed circuit board (PCB) structure in which a protection circuit (not shown) for controlling the overcharge, the overdischarge, and the overcurrent of the battery is a printed on a rectangular structure made of epoxy composite. To the bottom of the protection circuit board 310 are attached a pair of nickel plates 331 and 332, which are connecting members electrically connected to the protection circuit. Specifically, the nickel plates 331 and 332 are electrically connected to the anode and the cathode of the battery cell, respectively.

One end of the PTC element 320 is connected to the anode terminal 120 of the battery cell 100 (see FIG. 4), and the other end of the PTC element 320 is connected to the anode of the protection circuit board 310. The cathode terminal 130 of the battery cell 100 is directly connected to the cathode of the protection circuit board 310.

Hereinafter, a process for assembling the secondary battery pack according to a preferred embodiment of the present invention will be described in detail with reference to FIGS. 7 to 10, which are partial front views illustrating the secondary battery pack assembly process.

Figure 7:
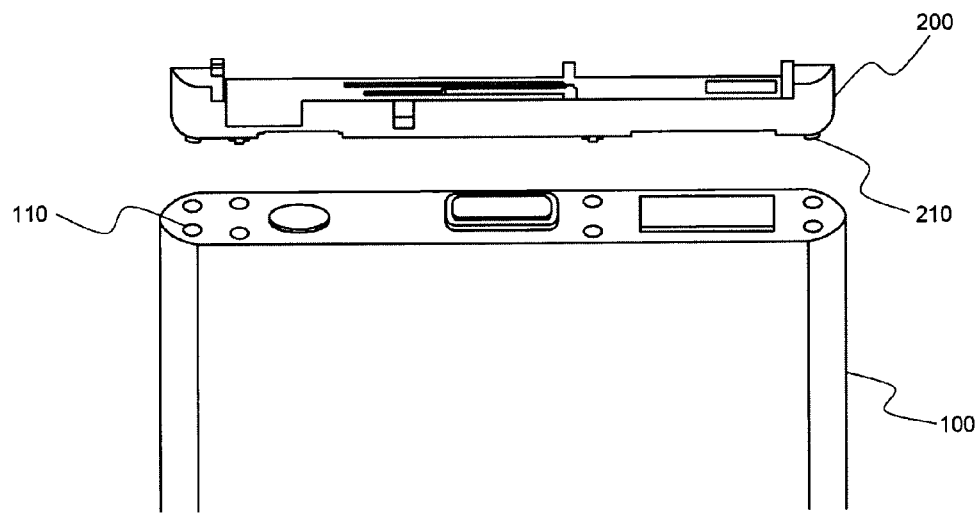
FIGS. 7 to 10 are partial front views illustrating a process for assembling the secondary battery pack according to a preferred embodiment of the present invention.

Referring first to FIG. 7, the battery cell 100 is provided at the top thereof with a plurality of coupling grooves 110, and the insulative mounting member 200 is provided at the bottom thereof with a plurality of coupling protrusions 210 corresponding to the coupling grooves 110. Consequently, the coupling of the insulative mounting member 200 to the battery cell 100 is accomplished by the insertion of the coupling protrusions 210 into the corresponding coupling grooves 110.

Figure 8:
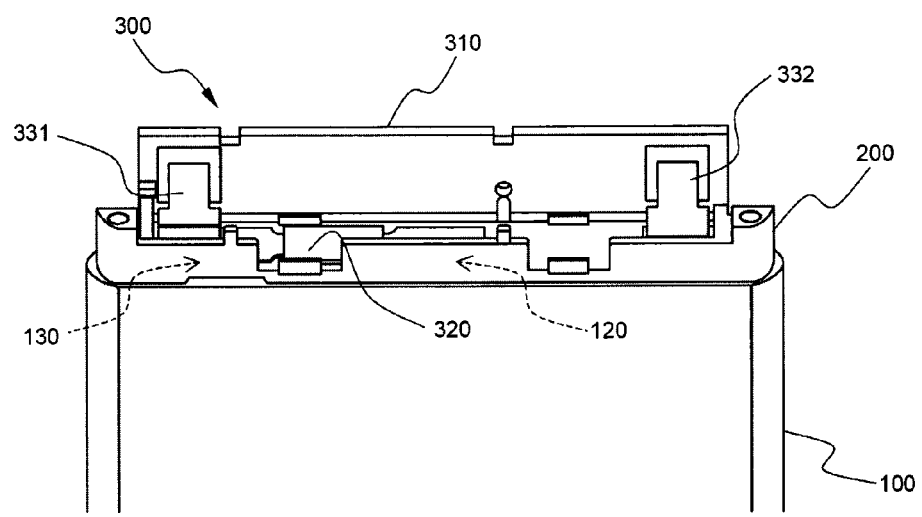
Figure 9:
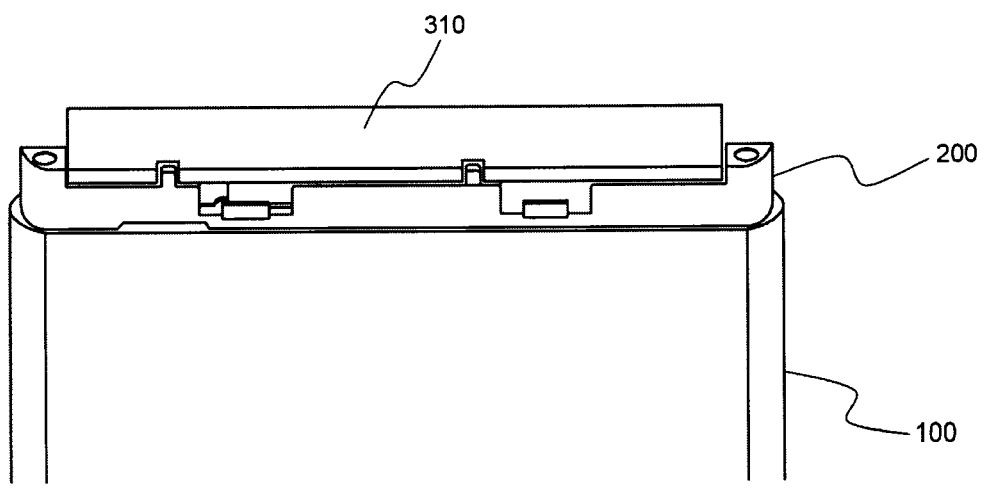

Subsequently, as shown in FIGS. 8 and 9, the safety element 300, including the protection circuit board 310 and the PTC element 320, is placed on the insulative mounting member 200. While the protection circuit board 310 is located such that the protection circuit board 310 is perpendicular to the top of the battery cell 100, one end of the PTC element 320 is connected to the anode terminal 120 of the battery cell 100, and the other end of the PTC element 320 is connected to the anode of the protection circuit board 310. The cathode terminal 130 is connected to the cathode of the protection circuit board 31. At this time, the electrical connection between the PTC element 320 and the protection circuit board 310 and the electrical connection between the cathode terminal 130 of the battery cell 100 and the protection circuit board 310 are carried out using the nickel plates 331 and 332. Subsequently, the nickel plates 331 and 332 are bent, such that the protection circuit board 310 can be placed on the insulative mounting member 200 in parallel with the top of the battery cell 100. The nickel plates 331 and 332 are coupled to the protection circuit board 310 such that the bent portions of the nickel plates 331 and 332 are directed to the same side. The coupling positions of the nickel plates 331 and 332 and the bent shapes of the nickel plates 331 and 332 are shown in FIG. 3.

Figure 10:
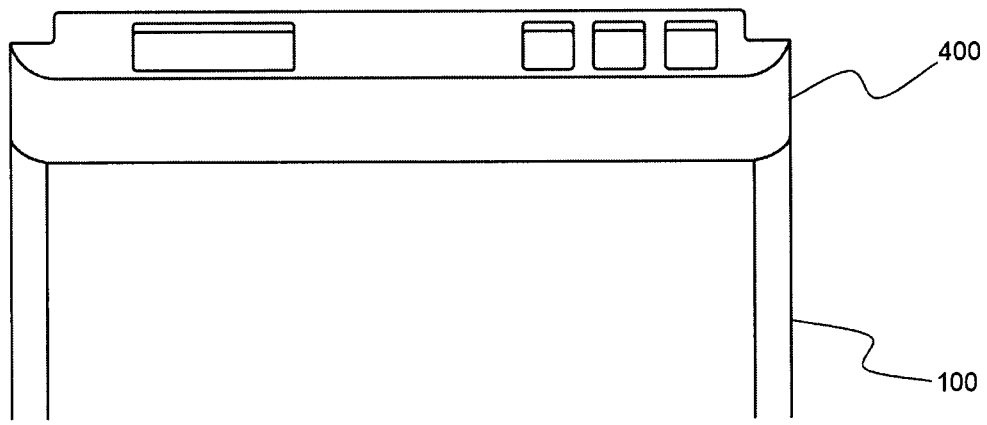

Finally, as shown in FIG. 10, the insulative cap 400 is coupled to the top of the battery cell such that the insulative cap 400 surrounds the insulative mounting member 200 while the safety element (not shown) is placed on the insulative mounting member 200. The downward extending portion of the insulative cap 400 surrounds the outside of the top of the battery cell 100. Consequently, the mechanical coupling between the insulative cap 400 and the battery cell 100 is accomplished.

Figure 11:
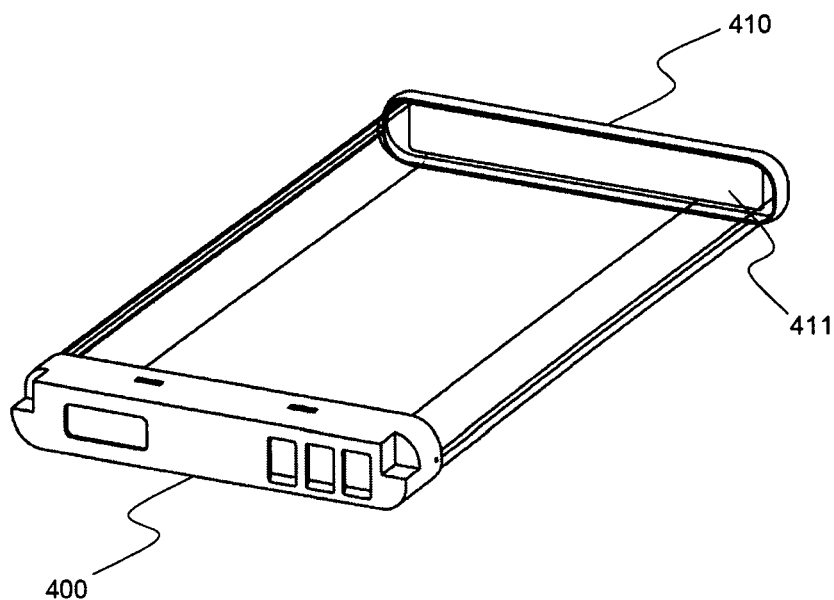
FIG. 11 is a typical view illustrating a secondary battery pack according to a preferred embodiment of the present invention.

FIG. 11 is a perspective view typically illustrating a secondary battery pack according to a preferred embodiment of the present invention constructed in a structure in which a top cap and a bottom cap are coupled to a battery cell.

Referring to FIG. 11, another insulative cap (bottom cap) 410 is coupled to the bottom of the battery cell 100 in addition to the insulative cap 400 coupled to the top of the battery cell 100. Specifically, a double-sided adhesive bottom cap tape 411 is attached to the bottom of the battery cell 100, and the insulative bottom cap 410 is fixed to the bottom of the battery cell 100 by the bottom cap tape 411.

Figure 12:
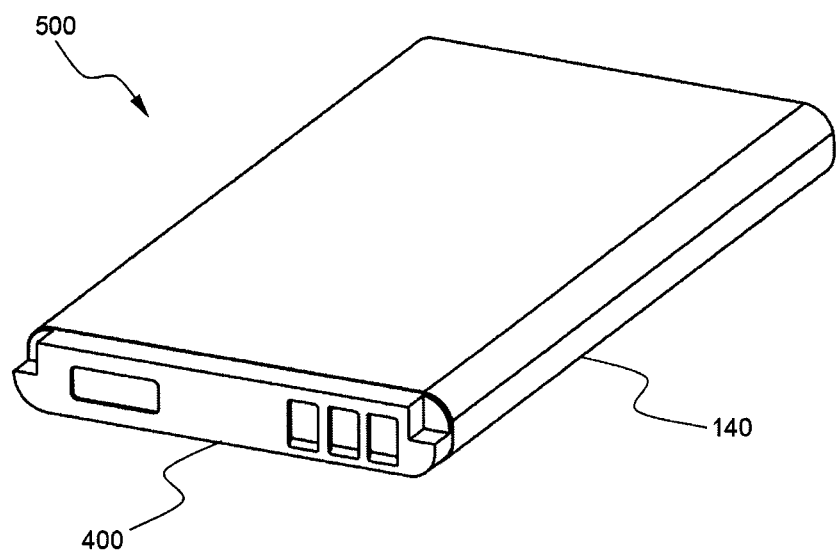
FIG. 12 is a perspective view illustrating a secondary battery pack completed according to a preferred embodiment of the present invention.

FIG. 12 is a perspective view illustrating a secondary battery pack completed according to a preferred embodiment of the present invention.

Referring to FIG. 12, the secondary battery pack 500 is constructed in a structure in which the remaining parts of the secondary battery pack 500, excluding an external input and output terminal part, are electrically insulated from the outside by the insulative top cap 400, the sheathing film 140, and the bottom cap (not shown), while the safety element and the insulative mounting member are coupled to the top of the battery cell.

The shape, position, and number of the coupling grooves, formed at the top of the battery cell, and the coupling protrusions corresponding to the coupling grooves may be changed based on the above description within the scope of the present invention.

Hereinafter, an example of the present invention will be described in more detail. It should be noted, however, that the scope of the present invention is not limited by the illustrated example.

EXAMPLE 1

Slurry, prepared by adding lithium cobalt oxide, PVdf, and a conducting agent in a well-known composition ratio, was coated on an aluminum current collector to manufacture cathodes. Slurry, prepared by adding graphite, PVdf, and a conducting agent in a well-known composition ratio, was coated on a copper current collector to manufacture anodes.

Separators, having a size slightly greater than that of the cathodes and the anodes, were disposed respectively between the cathodes and the anodes to manufacture an electrode assembly. The manufactured electrode assembly was mounted in a prismatic aluminum battery container. A battery container cover was mounted to the battery container, and an electrolyte was injected into the battery container through an injection port, to manufacture a battery cell.

Coupling protrusions, formed at the bottom of an insulative mounting member, were inserted into coupling grooves, formed at the top of the battery cell having a structure as shown in FIG. 3, while an adhesive agent was injected in the coupling grooves, such that the insulative mounted member was coupled to the top of the battery cell.

Subsequently, a safety element was connected to the insulative mounted member, insulative top and bottom caps were coupled to the battery cell, and the outer circumference of the battery cell was covered by a sheathing film, to manufacture a secondary battery pack having a structure shown in FIG. 12.

COMPARATIVE EXAMPLE 1

A secondary battery pack was manufacture in the same manner as Example 1 except that the insulative mounting member was coupled to the battery cell by an adhesive applied between the insulative mounting member and the battery cell without forming the coupling grooves and the coupling protrusions at the top of the battery cell and the bottom of the mounting insulating member.

EXPERIMENTAL EXAMPLE 1

Figure 13:
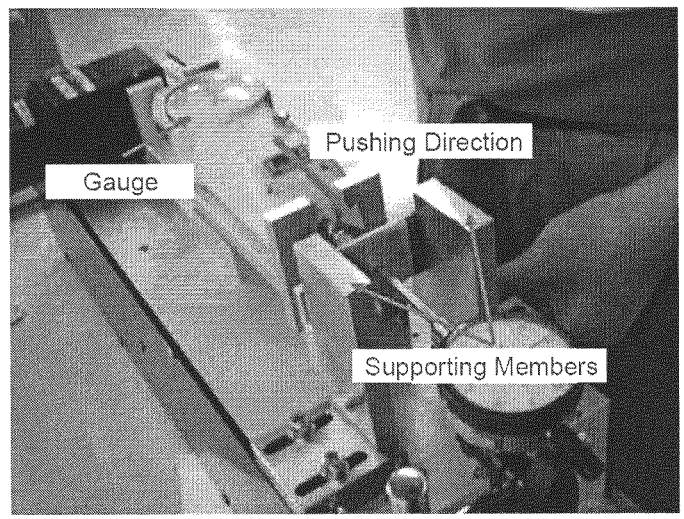
FIGS. 13 and 14 are photographs illustrating an experimental process of Experimental example 1 of the present invention.
Figure 14:
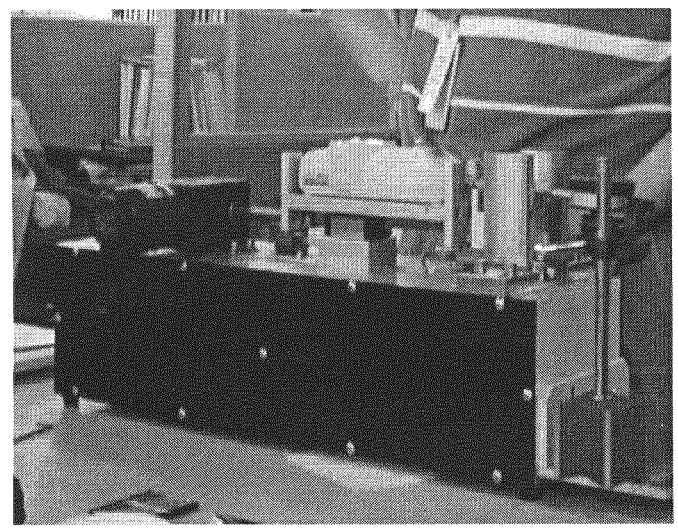

Bending tests were carried out on 20 battery packs manufactured according to
Example 1 and 20 battery packs manufactured according to Comparative example 1, to measure the coupling strength between the battery cell of each battery and the insulative mounting member coupled to the battery cell (See FIGS. 13 and 14). Specifically, load applied to the middle of each battery pack was gradually increased, while the top cap and the bottom cap of each battery pack were fixed. The magnitudes of the load when the battery packs broke are indicated in Table 1 below.

TABLE 1

| Breaking load (kgf) | Example 1 | Comparative example 1 |
| --- | --- | --- |
| Less than 25 | 0 | 6 |
| 25 to 30 | 0 | 12 |
| 30 to 35 | 0 | 2 |
| 45 to 50 | 9 | — |
| 50 to 55 | 10 | — |
| More than 55 | 1 | — |

As can be seen from Table 1 above, the coupling force of the battery packs manufactured according to Example 1 was greatly improved as compared to the coupling force of the battery packs manufactured according to Comparative example 1.

Specifically, when load of less than 35 kgf was applied to the battery packs manufactured according to Comparative example 1, the battery packs broke. Most of the battery packs broke even when load of 30 kgf was applied to the battery packs. On the contrary, when load of more than 45 kgf was applied to the battery packs manufactured according to Example 1, the battery packs broke. Some of the battery packs withstood even a load of 55 kgf. This is because, for the battery packs manufactured according to Comparative example 1, the separation between the battery cells and the corresponding insulative mounting members occurred, when impacts having a magnitude exceeding the adhesive force of the adhesive were applied to the battery packs, whereas, for the battery packs manufactured according to Example 1, the coupling between the battery cells and the corresponding insulative mounting members was greatly increased by the mechanical coupling between the coupling protrusions and the corresponding coupling grooves, even though a relative small amount of adhesive was used or no adhesive was used.

EXPERIMENTAL EXAMPLE 2

Figure 15:
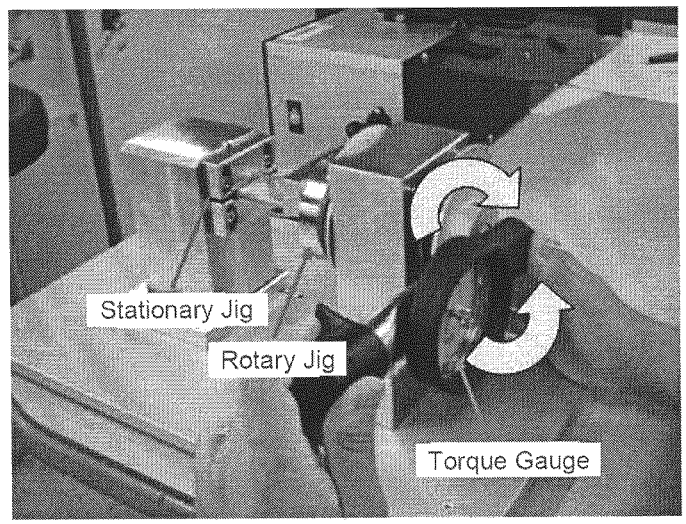
FIGS. 15 and 16 are photographs illustrating an experimental process of Experimental example 2 of the present invention.
Figure 16:
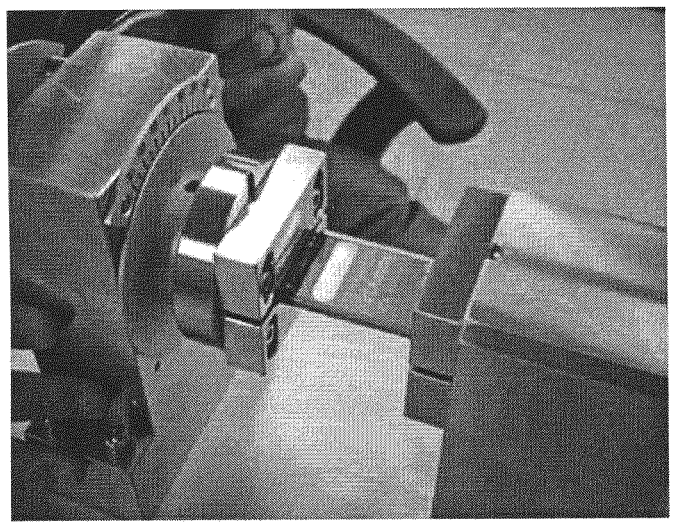

Twist tests were carried out on 20 battery packs manufactured according to Example 1 and 20 battery packs manufactured according to Comparative example 1, to measure the coupling strength between the battery cell of each battery and the insulative mounting member coupled to the battery cell (See FIGS. 15 and 16). Specifically, the bottom cap of each battery pack was twisted in one direction, while the top cap of each battery pack was fixed. At this time, the twisting force was gradually increased to manufacture the magnitudes of the twisting force when the separation between each battery cell and the insulative mounting member coupled to the top of each battery cell occurred. The magnitudes of the twisting force when the battery packs broke are indicated in Table 2 below.

TABLE 2

| Breaking torque (kg · cm) | Example 1 | Comparative example 1 |
|---|---|---|
| Less than 20 | 0 | 15 |
| 20 to 25 | 0 | 5 |
| 25 to 30 | 0 | — |
| 30 to 35 | 0 | — |
| 35 to 40 | 7 | — |
| 40 to 45 | 11 | — |
| More than 45 | 2 | — |

As can be seen from Table 2 above, the coupling force of the battery packs manufactured according to Example 1 was greatly improved as compared to the coupling force of the battery packs manufactured according to Comparative example 1.

Specifically, when a twisting force of less than 25 kg.cm was applied to the battery packs manufactured according to Comparative example 1, the most of the battery packs broke. On the contrary, when a twisting force of more than 35 kg.cm was applied to the battery packs manufactured according to Example 1, the battery packs broke. This is because, for the battery packs manufactured according to Comparative example 1, the coupling between the battery cells and the corresponding insulative mounting members were accomplished by only the adhesive, whereas, for the battery packs manufactured according to Example 1, the coupling between the battery cells and the corresponding insulative mounting members were accomplished by the mechanical coupling between the coupling protrusions and the corresponding coupling grooves. Especially, the coupling force of the battery packs manufactured according to Example 1 was greatly increased when the twisting force was applied to the battery packs.

INDUSTRIAL APPLICABILITY

As apparent from the above description, the assembly process of the secondary battery pack according to the present invention is greatly simplified. Also, the volume of the member mounted to the top of the battery cell is minimized, and, at the same time, the coupling strength between the battery cell and the mounting member is stably maintained.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secondary battery pack comprising:
    a battery cell having an electrode assembly of a cathode/separator/anode structure mounted in a battery case together with an electrolyte in a sealed state;
    an insulative mounting member having openings, through which electrode terminals of the battery cell are exposed to an outside, the insulative mounting member being in direct contact with the top of the battery cell;
    a safety element mounted to a top of the insulative mounting member; and
    an insulative cap coupled to the top of the battery cell such that the insulative cap surrounds the insulative mounting member while the safety element is mounted to the insulative mounting member,
    wherein the battery case is provided at the top thereof with at least one coupling groove, and the insulative mounting member is provided at a bottom thereof with at least one coupling protrusion corresponding to the at least one coupling groove, whereby the coupling of the insulative mounting member to the battery cell is accomplished by insertion of the coupling protrusion into the coupling groove, and
    wherein the insulative mounting member has a size approximately corresponding to that of the top of the battery cell, the insulative mounting member is provided at the middle thereof with a first opening, through which a first electrode terminal of the battery cell is exposed to the outside, and the insulative mounting member is provided at a position spaced a predetermined distance from the first opening with a second opening, through which a portion of the top of the battery case of the battery cell is exposed to the outside.

2. The secondary battery pack according to claim 1, wherein the battery case is a metal container.

3. The secondary battery pack according to claim 1, wherein the insulative mounting member is constructed in a structure in which opposite-side ends of the insulative mounting member protrude upward by a predetermined height.

4. The secondary battery pack according to claim 1, wherein the safety element is one or more selected from a group consisting of a positive temperature coefficient (PTC) element, a fuse, and a protection circuit board.

5. The secondary battery pack according to claim 1, wherein the safety element includes a PTC element and a protection circuit board, one end of the PTC element is connected to the first electrode terminal of the battery cell, an other end of the PTC element is connected to the protection circuit board, and the second electrode terminal of the battery cell is connected to the protection circuit board.

6. The secondary battery pack according to claim 5, wherein a first connection between the PTC element and the protection circuit board and a second connection between the second electrode terminal and the protection circuit board are carried out by variable connecting members.

7. The secondary battery pack according to claim 6, wherein the connecting member for the first connection and the connecting member for the second connection are coupled to the protection circuit board, and the connecting members are coupled to the respective electrode terminals of the battery cell.

8. The secondary battery pack according to claim 7, wherein the connecting members are coupled to the electrode terminals of the battery cell, while the protection circuit board is placed on the top of the battery cell such that an angle between the protection circuit board and the top of the battery cell exceeds approximately 90; degrees, the variable connecting members are bent such that the protection circuit board is placed on the insulative mounting member while the protection circuit board is parallel with the top of the battery cell, and the connecting members are coupled to the protection circuit board such that a bent portions of the connecting members are directed to the same side.

9. The secondary battery pack according to claim 6, wherein the connecting members are nickel plates.

10. The secondary battery pack according to claim 1, wherein an adhesive is injected into the coupling grooves before the coupling protrusions are inserted into the corresponding coupling grooves.

11. The secondary battery pack according to claim 1, wherein the insulative cap extends downward by a predetermined length sufficient for at least some of the insulative cap to surround the outside of the top of the battery cell while the insulative cap is mounted on the battery cell.

12. The secondary battery pack according to claim 11, wherein a downward extending portion of the insulative cap is fixed to the outside of the top of the battery cell by a bonding fashion or a mechanical coupling fashion.

13. The secondary battery pack according to claim 1, further comprising:
   another insulative cap coupled to the bottom of the battery cell.

14. The secondary battery pack according to claim 1, further comprising:
   a sheathing film attached to an outer surface of the battery case of the battery cell.

15. The secondary battery pack according to claim 14, wherein the sheathing film is attached to the outer surface of the battery case of the battery cell such that the sheathing film surrounds the downward extending portion of the insulative cap.

16. The secondary battery pack according to claim 1, wherein the battery cell is a prismatic lithium secondary battery cell.

17. The secondary battery pack according to claim 4, wherein the safety element includes a PTC element and a protection circuit board, one end of the PTC element is connected to the first electrode terminal of the battery cell, the other end of the PTC element is connected to the protection circuit board, and the second electrode terminal of the battery cell is connected to the protection circuit board.

18. The secondary battery pack according to claim 12, further comprising:
   a sheathing film attached to the outer surface of the battery case of the battery cell.

* * * * *